(12) United States Patent
Zhang et al.

(10) Patent No.: US 11,770,473 B2
(45) Date of Patent: Sep. 26, 2023

(54) AVOID AND REACT TO SUDDEN POSSIBILITY OF DAMAGE TO RECEIVER IN SELF-INTERFERENCE MEASUREMENT

(71) Applicant: QUALCOMM Incorporated, San Diego, CA (US)

(72) Inventors: Qian Zhang, Basking Ridge, NJ (US); Sony Akkarakaran, Poway, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/243,968

(22) Filed: Apr. 29, 2021

(65) Prior Publication Data

US 2021/0344789 A1  Nov. 4, 2021

Related U.S. Application Data

(60) Provisional application No. 63/019,102, filed on May 1, 2020.

(51) Int. Cl.
| | | |
|---|---|---|
| *H04M 1/72463* | (2021.01) | |
| *H04B 17/345* | (2015.01) | |
| *H04B 17/318* | (2015.01) | |
| *H04W 24/04* | (2009.01) | |
| *H04W 52/14* | (2009.01) | |
| *H04W 52/52* | (2009.01) | |
| *H04W 52/24* | (2009.01) | |

(52) U.S. Cl.
CPC ...... *H04M 1/72463* (2021.01); *H04B 17/318* (2015.01); *H04B 17/345* (2015.01); *H04W 24/04* (2013.01); *H04W 52/146* (2013.01); *H04W 52/245* (2013.01); *H04W 52/52* (2013.01)

(58) Field of Classification Search
CPC .... H04B 17/318; H04B 17/345; H04B 17/17; H04B 17/19; H04B 7/06; H04M 1/72463; H04W 24/04; H04W 52/146; H04W 52/245; H04W 52/52; H04W 52/243; H04W 52/367; H04L 1/18
See application file for complete search history.

(56) References Cited

U.S. PATENT DOCUMENTS

| | | | | |
|---|---|---|---|---|
| 5,297,259 A | * | 3/1994 | Nishiyama | ............ G06F 3/0227 |
| | | | | 710/67 |
| 6,192,238 B1 | * | 2/2001 | Piirainen | .................. H04L 1/20 |
| | | | | 455/422.1 |
| 6,366,626 B1 | * | 4/2002 | Boyd | ................. H03H 17/0254 |
| | | | | 375/343 |

(Continued)

OTHER PUBLICATIONS

U.S. Appl. No. 62/887,535 (Year: 2019).*
International Search Report and Written Opinion—PCT/US2021/030094—ISA/EPO—dated Jul. 19, 2021.

*Primary Examiner* — Dung B Huynh
(74) *Attorney, Agent, or Firm* — Patterson & Sheridan, L.L.P.Qualcomm Incorporated

(57) ABSTRACT

Aspects of the present disclosure relate to wireless communications, and more particularly, to techniques for detecting the possibility of damage to a receiver during a self-interference measurement procedure and taking action to avoid or mitigate such damage.

27 Claims, 11 Drawing Sheets

(56) References Cited

U.S. PATENT DOCUMENTS

| | | | | |
|---|---|---|---|---|
| 8,725,067 | B2* | 5/2014 | Ahn | H04B 7/15542 455/7 |
| 9,420,395 | B1* | 8/2016 | Khlat | H04W 52/146 |
| 11,152,966 | B1* | 10/2021 | Oyman | H04J 11/004 |
| 11,271,699 | B1* | 3/2022 | Eyuboglu | H04W 80/02 |
| 11,375,527 | B1* | 6/2022 | Eyuboglu | H04W 72/1273 |
| 2004/0100897 | A1* | 5/2004 | Shattil | H04L 27/2631 370/206 |
| 2008/0019452 | A1* | 1/2008 | Hoshino | H04B 7/04 375/260 |
| 2008/0048781 | A1* | 2/2008 | Wagner | H03G 3/001 330/278 |
| 2009/0046627 | A1* | 2/2009 | Xu | H04L 1/1858 370/328 |
| 2010/0172278 | A1* | 7/2010 | Nishio | H04W 52/42 370/312 |
| 2010/0222012 | A1* | 9/2010 | Shibuya | H04B 17/336 455/79 |
| 2012/0321009 | A1* | 12/2012 | Chintalapudi | H04L 45/24 375/267 |
| 2013/0003580 | A1* | 1/2013 | Kovacs | H04B 1/707 370/252 |
| 2013/0044621 | A1* | 2/2013 | Jung | H04B 17/345 370/336 |
| 2013/0128767 | A1* | 5/2013 | Chun | H04W 24/10 370/252 |
| 2013/0194984 | A1* | 8/2013 | Cheng | H04W 72/082 370/294 |
| 2013/0242771 | A1* | 9/2013 | Ohta | H04W 24/02 370/252 |
| 2013/0286903 | A1* | 10/2013 | Khojastepour | H04B 1/123 370/280 |
| 2014/0148178 | A1* | 5/2014 | Wippich | H04W 68/025 455/450 |
| 2014/0198688 | A1* | 7/2014 | Li | H04B 1/525 370/278 |
| 2015/0071062 | A1* | 3/2015 | Cheng | H04L 5/14 370/230 |
| 2015/0180640 | A1* | 6/2015 | Liu | H04B 1/525 370/278 |
| 2015/0311931 | A1* | 10/2015 | Rozental | H04B 1/709 375/343 |
| 2015/0382375 | A1 | 12/2015 | Bhushan et al. | |
| 2016/0065251 | A1* | 3/2016 | Yoo | H04B 1/10 455/114.3 |
| 2016/0149691 | A1* | 5/2016 | Chang | H04L 5/1461 370/276 |
| 2016/0183100 | A1* | 6/2016 | Xue | H04W 24/02 370/252 |
| 2016/0233904 | A1* | 8/2016 | Wu | H04L 5/1469 |
| 2016/0285602 | A1* | 9/2016 | Fang | H04W 52/244 |
| 2017/0026912 | A1* | 1/2017 | Lee | H04W 74/004 |
| 2017/0127358 | A1* | 5/2017 | Jain | H04W 52/365 |
| 2017/0257148 | A1* | 9/2017 | Choi | H01Q 7/00 |
| 2017/0257184 | A1* | 9/2017 | Stirling-Gallacher | H04L 1/0026 |
| 2017/0264347 | A1* | 9/2017 | Le-Ngoc | H04B 7/0456 |
| 2017/0310385 | A1* | 10/2017 | Hwang | H04W 72/0453 |
| 2017/0331526 | A1* | 11/2017 | Liang | H04W 72/042 |
| 2017/0373890 | A1* | 12/2017 | Fertonani | H04L 27/26 |
| 2018/0006690 | A1* | 1/2018 | Shepard | H04B 7/0452 |
| 2018/0006794 | A1* | 1/2018 | Lee | H04L 5/14 |
| 2018/0063745 | A1* | 3/2018 | Jain | H04W 28/04 |
| 2018/0098291 | A1* | 4/2018 | Fodor | H04W 52/346 |
| 2018/0123710 | A1* | 5/2018 | Kim | H04B 17/345 |
| 2018/0131502 | A1* | 5/2018 | Askar | H04B 1/123 |
| 2018/0337756 | A1* | 11/2018 | Nam | H04L 5/14 |
| 2019/0007124 | A1* | 1/2019 | Seo | H04L 5/0053 |
| 2019/0173503 | A1* | 6/2019 | Kolodziej | H04B 10/40 |
| 2019/0173693 | A1* | 6/2019 | Aboul-Magd | H04W 72/0406 |
| 2019/0190685 | A1* | 6/2019 | Xia | H04L 5/143 |
| 2019/0207738 | A1* | 7/2019 | Son | H04L 5/14 |
| 2019/0222296 | A1* | 7/2019 | Khandani | H04B 7/086 |
| 2019/0260485 | A1* | 8/2019 | Byun | H04B 17/336 |
| 2019/0268802 | A1* | 8/2019 | Bhutani | H04B 17/318 |
| 2019/0335471 | A1* | 10/2019 | Kim | H04W 72/082 |
| 2019/0342057 | A1* | 11/2019 | Rico Alvarino | H04W 72/00 |
| 2019/0393927 | A1* | 12/2019 | Strobel | H04L 5/14 |
| 2020/0053661 | A1* | 2/2020 | Yang | H04W 52/281 |
| 2020/0127699 | A1* | 4/2020 | Wang | H04B 1/44 |
| 2020/0145175 | A1* | 5/2020 | Hassan Hussein | H04W 72/56 |
| 2020/0169287 | A1* | 5/2020 | Kim | H04B 1/48 |
| 2020/0221449 | A1* | 7/2020 | Bang | H04W 72/042 |
| 2020/0267674 | A1* | 8/2020 | Ji | H04W 56/001 |
| 2020/0412519 | A1* | 12/2020 | Krishnaswamy | H04B 7/0695 |
| 2021/0050666 | A1* | 2/2021 | Cirik | H01Q 3/24 |
| 2021/0067307 | A1* | 3/2021 | Kim | H04L 5/14 |
| 2021/0068130 | A1* | 3/2021 | Liu | H04W 72/1268 |
| 2021/0105725 | A1* | 4/2021 | Karjalainen | H04W 52/242 |
| 2021/0135770 | A1* | 5/2021 | Schober | H04B 17/14 |
| 2021/0136696 | A1* | 5/2021 | Burke | H04W 52/146 |
| 2021/0153214 | A1* | 5/2021 | Zhang | H04L 5/0057 |
| 2021/0258105 | A1* | 8/2021 | Shrestha | H04L 1/1896 |
| 2021/0329473 | A1* | 10/2021 | Zhang | H04W 16/28 |
| 2021/0360575 | A1* | 11/2021 | Abotabl | H04W 52/367 |
| 2021/0368452 | A1* | 11/2021 | Yang | H04W 52/146 |
| 2021/0409097 | A1* | 12/2021 | Zhang | H04B 7/088 |
| 2022/0045714 | A1* | 2/2022 | Chen | H04L 5/14 |
| 2022/0150005 | A1* | 5/2022 | Zhang | H04W 76/15 |
| 2022/0159588 | A1* | 5/2022 | Wang | H04W 52/383 |
| 2022/0167424 | A1* | 5/2022 | Zhang | H04W 52/48 |
| 2022/0182160 | A1* | 6/2022 | Su | H04L 27/2691 |
| 2022/0232481 | A1* | 7/2022 | Kusashima | H04W 72/0446 |
| 2022/0240256 | A1* | 7/2022 | Balasubramanian | H04W 72/541 |
| 2022/0279537 | A1* | 9/2022 | Freda | H04W 72/569 |
| 2022/0322247 | A1* | 10/2022 | Sun | H04B 7/0695 |
| 2022/0346024 | A1* | 10/2022 | Abotabl | H04W 52/143 |
| 2023/0116005 | A1* | 4/2023 | Zhang | H04W 72/541 370/277 |

\* cited by examiner

Use Case 1

Use Case 2

Use Case 3

700

| gNB | UE | Description |
|---|---|---|
| Flex TDD Disabled | Flex TDD Disabled | Baseline Operation |
| Flex TDD Disabled | Flex TDD Enabled | Use Case 1 for mTRP |
| Flex TDD Enabled | Flex TDD Disabled | Use Case 2/ IAB |
| Flex TDD Enabled | Flex TDD Enabled | Use Case 3 |

FIG. 7

AVOID AND REACT TO SUDDEN POSSIBILITY OF DAMAGE TO RECEIVER IN SELF-INTERFERENCE MEASUREMENT

CROSS-REFERENCE TO RELATED APPLICATION

This application claims benefit of and priority to U.S. Provisional Patent Application No. 63/019,102, filed May 1, 2020, which is assigned to the assignee hereof and herein incorporated by reference in its entirety as if fully set forth below and for all applicable purposes.

TECHNICAL FIELD

Aspects of the present disclosure relate to wireless communications, and more particularly, to techniques for detecting the possibility of damage to a receiver during a self-interference measurement procedure and taking action to avoid or mitigate such damage.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a user equipment (UE). The method generally includes transmitting uplink reference signals (RS) via a first antenna panel; performing self-interference measurements based on the uplink RS as received via a second antenna panel; and reducing, based on the self-interference measurements, at least one of transmit power of the uplink RS or functionality of the receiver.

Certain aspects of the present disclosure provide an apparatus for wireless communication by a UE. The apparatus generally includes a memory and at least one processor coupled to the memory, the memory and the at least one processor being configured to transmit uplink RS via a first antenna panel; perform self-interference measurements based on the uplink RS as received via a second antenna panel; and reduce, based on the self-interference measurements, at least one of transmit power of the uplink RS or functionality of the receiver.

Certain aspects of the present disclosure provide an apparatus for wireless communication by a UE. The apparatus generally includes means for transmitting uplink RS via a first antenna panel; means for performing self-interference measurements based on the uplink RS as received via a second antenna panel; and means for reducing, based on the self-interference measurements, at least one of transmit power of the uplink RS or functionality of the receiver.

Certain aspects of the present disclosure provide a computer readable medium having instructions stored thereon for transmitting uplink RS via a first antenna panel; performing self-interference measurements based on the uplink RS as received via a second antenna panel; and reducing, based on the self-interference measurements, at least one of transmit power of the uplink RS or functionality of the receiver.

Certain aspects of the present disclosure provide a method for wireless communication by a network entity. The method generally includes receiving an indication, from a UE, that the UE detected a condition based on self-interference measurements performed based on an uplink RS transmitted via a first antenna panel of the UE while receiving via a second antenna panel of the UE; and signaling the UE to reduce at least one of transmit power of the uplink RS or functionality of the receiver, in response to detecting the condition.

Certain aspects of the present disclosure provide an apparatus for wireless communication by a network entity. The apparatus generally includes a memory and at least one processor coupled to the memory, the memory and the at least one processor being configured to receive an indication, from a UE, that the UE detected a condition based on self-interference measurements performed based on an uplink RS transmitted via a first antenna panel of the UE while receiving via a second antenna panel of the UE; and signal the UE to reduce at least one of transmit power of the uplink RS or functionality of the receiver, in response to detecting the condition.

Certain aspects of the present disclosure provide an apparatus for wireless communication by a network entity. The apparatus generally includes means for receiving an indication, from a UE, that the UE detected a condition based on self-interference measurements performed based on an uplink RS transmitted via a first antenna panel of the UE while receiving via a second antenna panel of the UE; and means for signaling the UE to reduce at least one of transmit power of the uplink RS or functionality of the receiver, in response to detecting the condition.

Certain aspects of the present disclosure provide a computer readable medium having instructions stored thereon for receiving an indication, from a UE, that the UE detected a condition based on self-interference measurements performed based on an uplink RS transmitted via a first antenna panel of the UE while receiving via a second antenna panel of the UE; and signaling the UE to reduce at least one of transmit power of the uplink RS or functionality of the receiver, in response to detecting the condition.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 summarizes the use cases shown in FIGS. 4-6.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
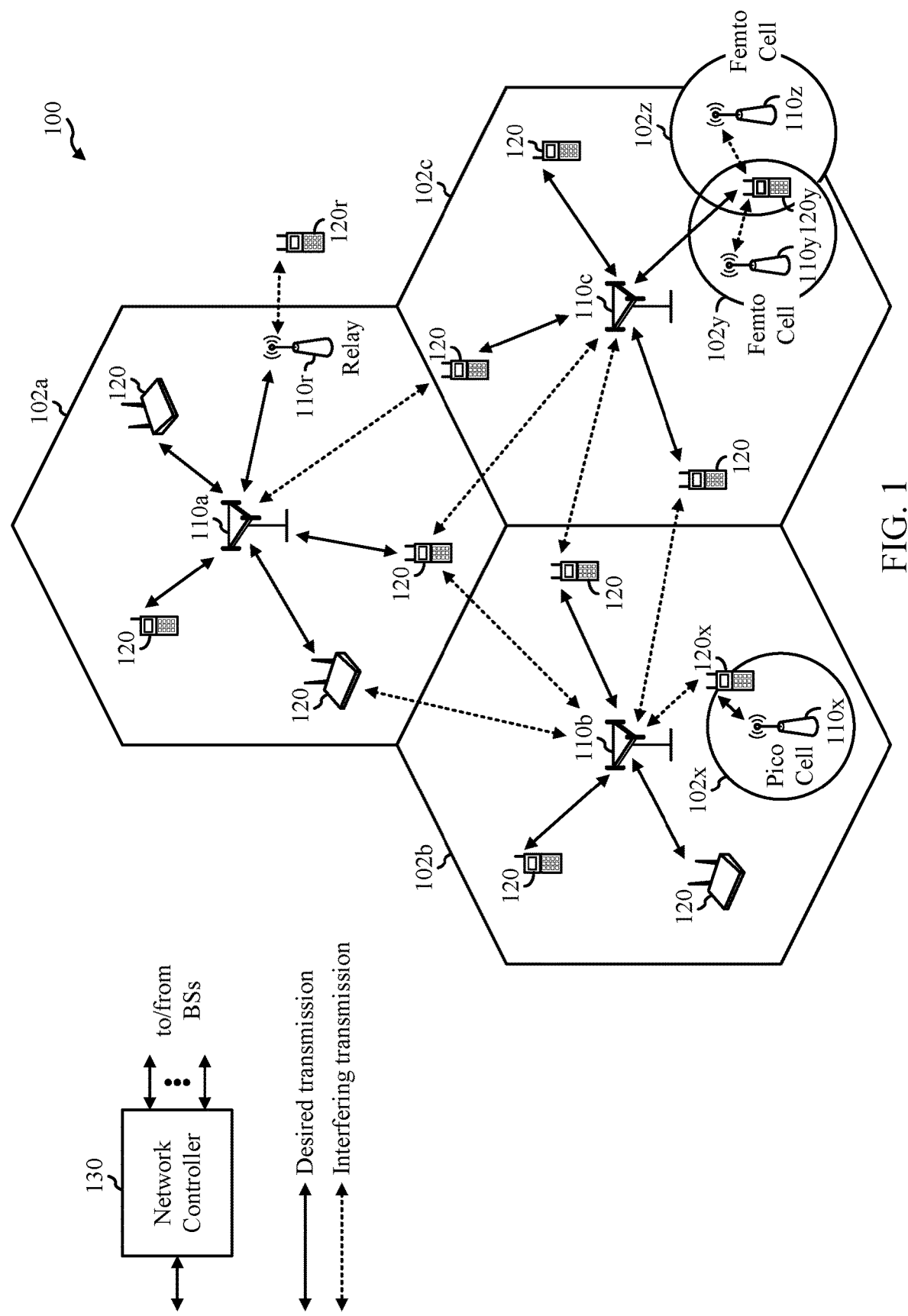
FIG. 1 is a block diagram conceptually illustrating an example telecommunications system, in accordance with certain aspects of the present disclosure.

Aspects of the present disclosure relate to wireless communications, and more particularly, to techniques for detecting the possibility of damage to a receiver based on self-interference measurements and taking action to avoid or mitigate such damage.

As will be described in greater detail below, the techniques may help enable full duplex communications that use the self-interference measurements, for example, to select transmit and receive beam pairs. Such beam pairs may be chosen to provide sufficient beam separation to allow simultaneous transmission and reception, on different antenna panels, in the same frequency range. The techniques described herein may allow for efficient selection of such beam pairs, while protecting the receiver from damage.

An antenna panel generally refers to an arrangements of antenna elements (e.g., an array). For example, a relatively large number of antenna elements may be assembled into multiple antenna panels for the purpose of cost reduction and power saving. NR supports multi-panel antenna array operation through introduction of new reference signals, measurement, and reporting procedures. Aspects of the present disclosure may provide protection from damage to receiver components connected to one antenna panel while transmitting signals from another antenna panel.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a UE 120 configured to perform operations 800 of FIG. 8 to detect possible damage to a receiver based on self-interference measurements (e.g., measurements taken during a self-interference measurement procedure). Similarly, the wireless network 100 may include a BS 110 configured to perform operations 900 of FIG. 9 to receive signaling, for example, indicating a UE (performing operations 800 of FIG. 8) has detected possible damage to a receiver during a self-interference measurement procedure.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100.

For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
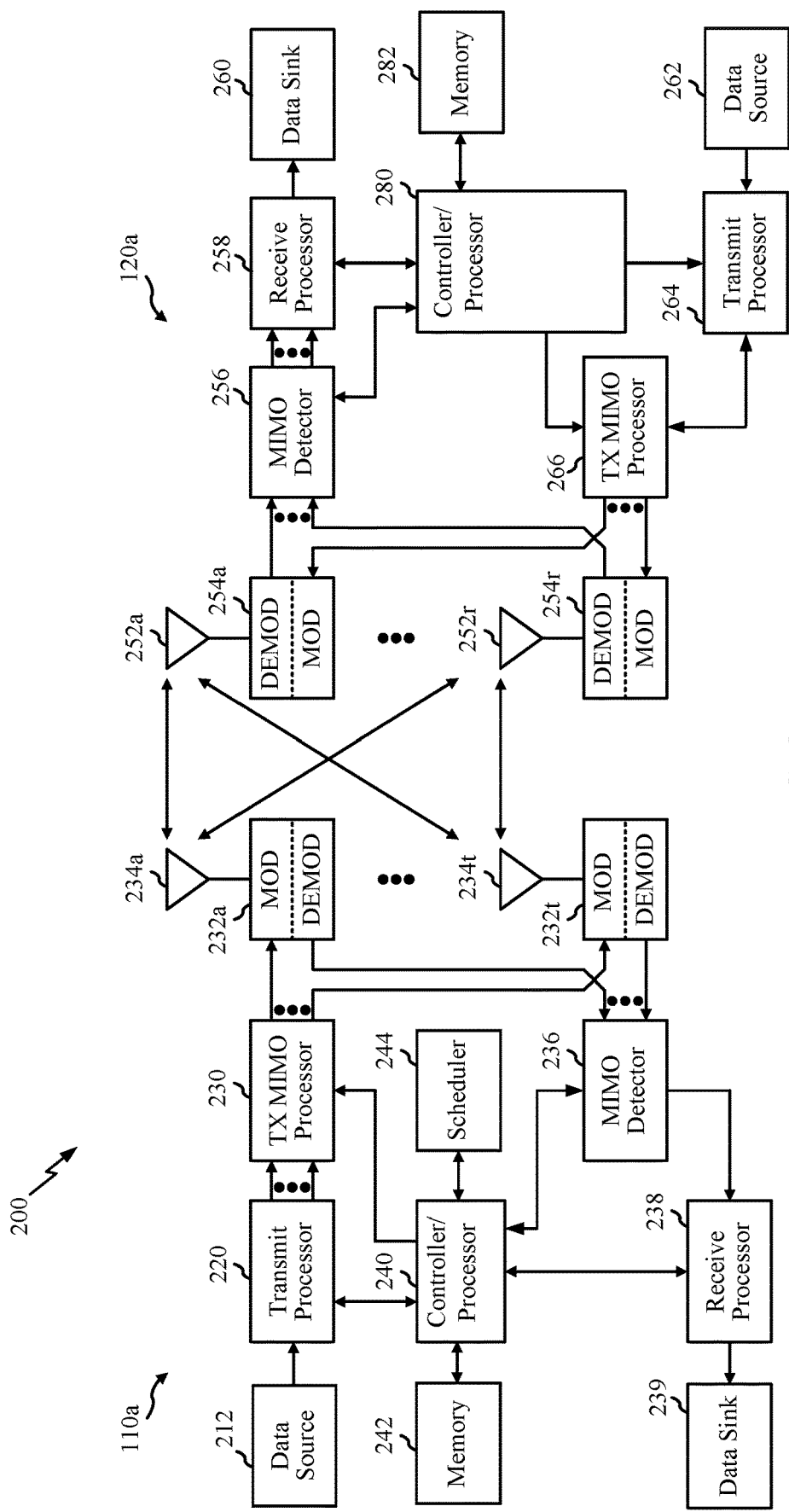
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, controller/processor 280 and/or other processors and modules at the UE 120a may perform (or be used by UE 120a to perform) operations 800 of FIG. 8. Similarly, the controller/processor 240 and/or other processors and modules at the BS 110a may perform or direct the execution of processes for the techniques described herein. For example, controller/processor 240 and/or other processors and modules at the BS 110a may perform (or be used by BS 121a to perform) operations 900 of FIG. 9. Although shown at the controller/processor, other components of the UE 120a or BS 110a may be used to perform the operations described herein.

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 3:
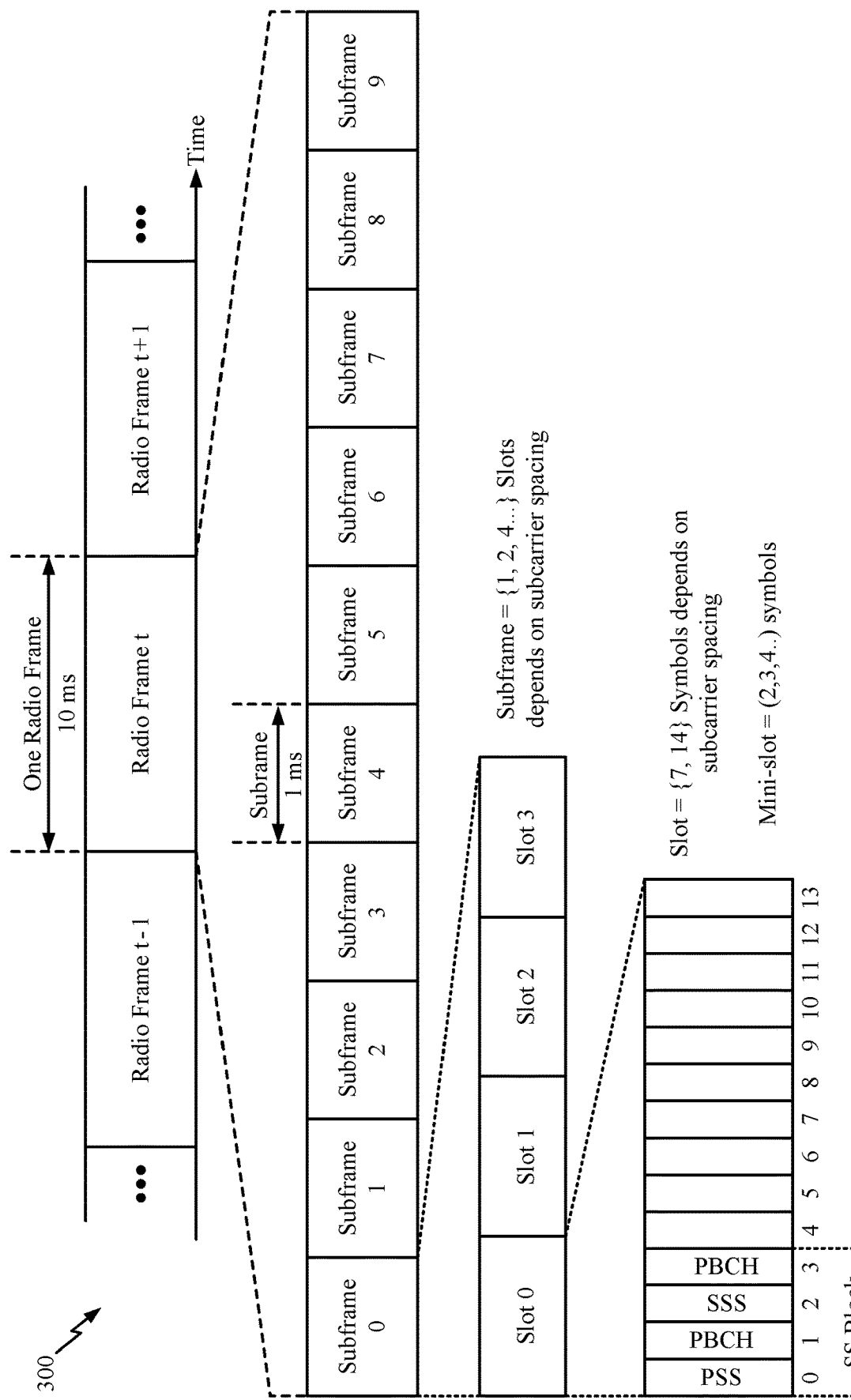
FIG. 3 illustrates an example of a frame format for a new radio (NR) system, in accordance with certain aspects of the present disclosure.

FIG. 3 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Example Detection and Mitigation of Possible Damage to a Receiver During a Self-Interference Measurement Procedure Aspects of the present disclosure relate to wireless communications, and more particularly, to techniques for detecting the possibility of damage to a receiver. For example, a UE may detect a condition that indicates a risk of damage to the receiver based on self-interference measurements (e.g., taken during a self-interference measurement procedure). Based on the detection, the UE may take action to avoid or mitigate such damage, such as reducing transmission power for uplink reference signals or reducing receiver functionality. The techniques may help enable full duplex communications that use the self-interference measurement procedure, for example, to select transmit and receive beam pairs (to provide sufficient beam separation), while protecting receiver components from damage.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec. In some cases, a frequency band referred to as FR2x may be used.

There are various motivations for utilizing full duplex (FD) communications, for example, for simultaneous UL/DL transmissions in FR2. In some cases, FD capability may enable flexible time division duplexing (TDD) capability at either the gNB or UE or both. As an example, at the UE, UL transmissions may be sent from one antenna panel (of multiple antenna panels) and DL reception may be performed at another antenna panel.

Flexible TTD capability may be conditional on beam separation (e.g., the ability to find transmitter/receiver (Tx/Rx) beam pairs that achieve sufficient separation). Flexible TDD capability may mean, for example, that a UE or base station is able to use FDD on slots conventionally reserved for uplink-only or downlink-only slots (or flexible slots that may be dynamically indicated as either uplink or downlink). Thus, potential benefits of full duplex communications include latency reduction (e.g., it may be possible to receive DL signals in what would conventionally be considered UL only slots, which can enable latency savings), spectrum efficiency enhancements (per cell and/or per UE), and overall more efficient resource utilization.

Figure 4:
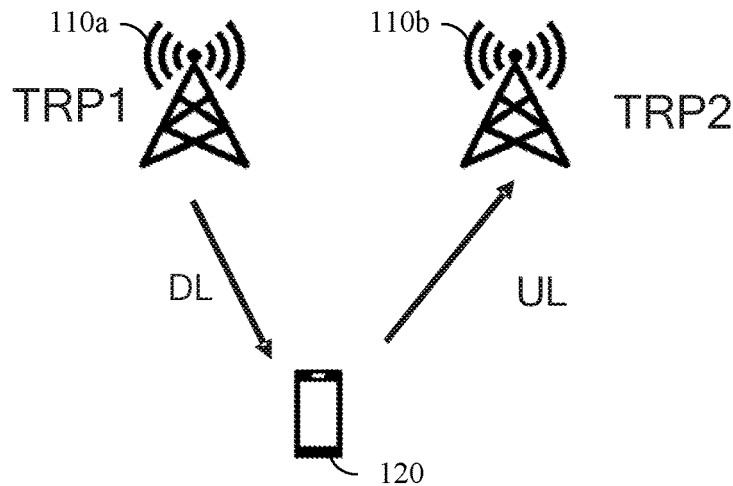
FIG. 4-6 illustrate different use cases for full-duplex communications, in which aspects of the present disclosure may be utilized.
Figure 5:
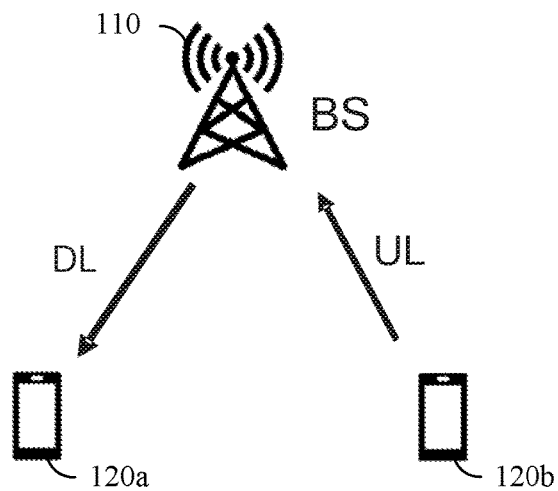
Figure 6:
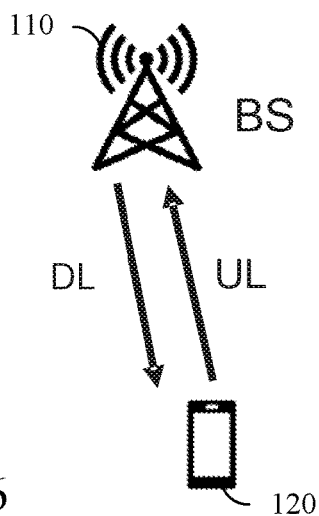

FIGS. 4, 5, and 6 illustrated example use cases for FD communications. FIG. 7 summarizes certain possible features of these use cases.

As illustrated in FIG. 4, for a first use case (Use Case 1), one UE 120 may simultaneously communicate with a first transmitter receiver point (TRP 1) 110*a* on the downlink, while transmitting to a second TRP 110*b* on the uplink. For this use case, flexible TDD may be disabled at the gNB (TRP) and enabled at the UE.

As illustrated in FIG. 5, for a second use case (Use Case 2), one BS 110 may simultaneously communicate with a first UE (UE 1 120*a*) on the downlink, while communicating with a second UE (UE 2 120*b*) on the uplink. For this use case, flexible TDD may be enabled at the BS (e.g., gNB) and disabled at the UE. Use cases with flexible TDD enabled at the gNB and disabled at the UE may be suitable for integrated access and backhaul (IAB) applications as well.

As illustrated in FIG. 6, for a third use case (Use Case 3), a UE 120 may simultaneously communicate with a base station 110, transmitting on the uplink while receiving on the downlink. For this use case, flexible TDD may be enabled at both the base station/gNB and the UE.

In some cases, self-interference measurement (SIM) at a UE may be needed to enable full duplex transmissions. For example, self-interference measurements may be used to select transmit and receive beam pairs that achieve suitable beam separation. Suitable beam separation of a transmit and receive beam pair may be indicated, for example, by relatively low self-interference measurements taken on one panel (using the receive beam) while transmitting uplink reference signals with another panel (using the transmit beam). Thus, during a SIM procedure, the UE may transmit reference signals on the uplink using a first antenna panel, while measuring the reference signals (on the downlink) with a second antenna panel.

When performing self-interference measurements, if the Tx power from one panel is too high, however, the receiver from another panel of the UE without sufficient beam separation may be damaged. This scenario could occur, for example, due to clutter-echo (in which reflections may increase the amplitude of a received signal).

Aspects of the present disclosure provide techniques that may be used to detect (sense) a condition associated with possible sudden damage to a UE receiver during a SIM procedure and to take action to avoid or mitigate such damage. For example, upon detecting such a condition, a UE may be configured to reduce transmission power for uplink reference signals or reduce receiver functionality FIGS. 8 and 9 illustrate example operations that may be performed by a UE and network entity, respectively, for detecting possible damage to a UE receiver based on self-interference measurements and for taking action to avoid or mitigate such damage.

Figure 8:
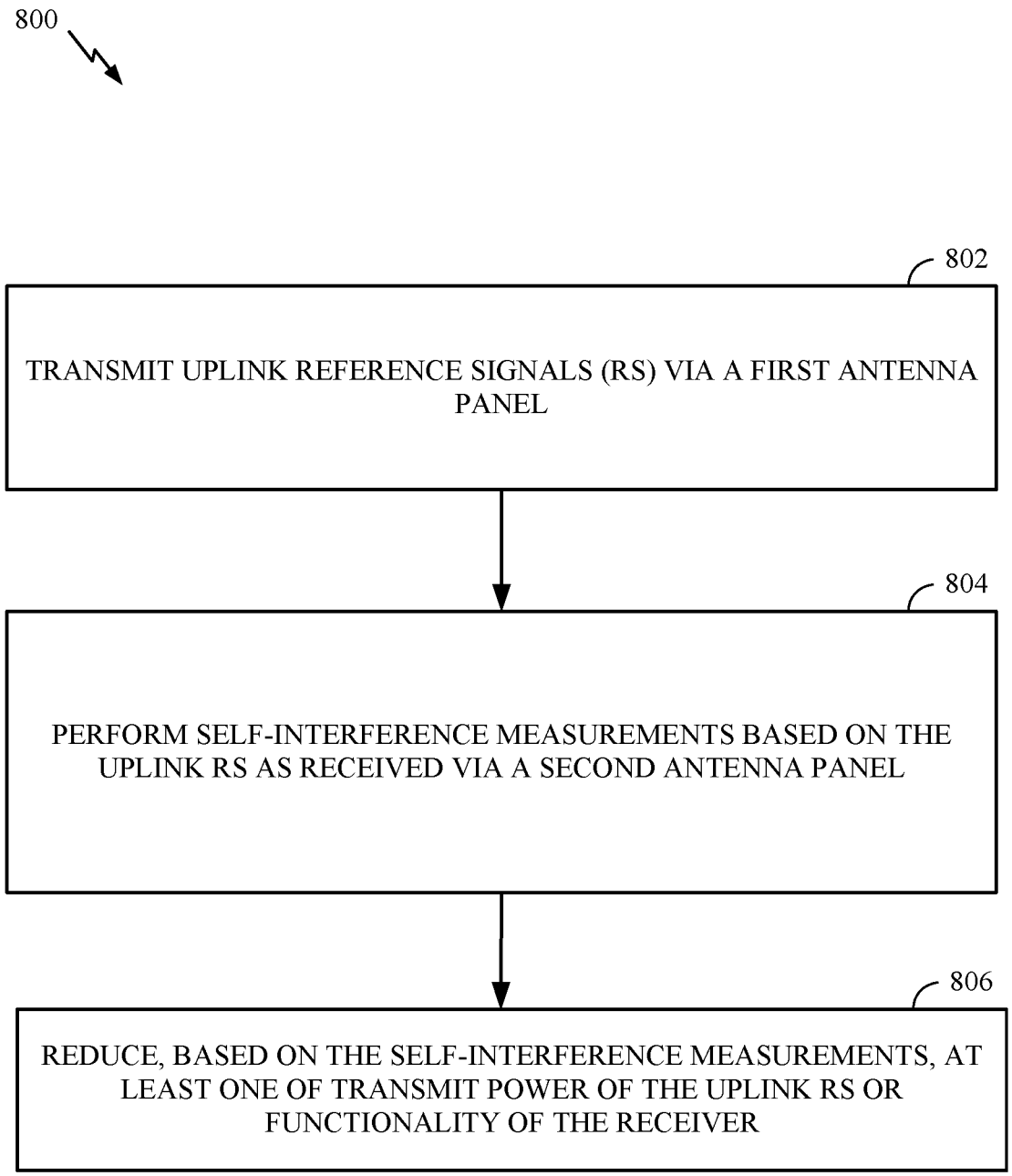
FIG. 8 illustrates example operations for wireless communications by a user equipment (UE), in accordance with certain aspects of the present disclosure.
Figure 9:
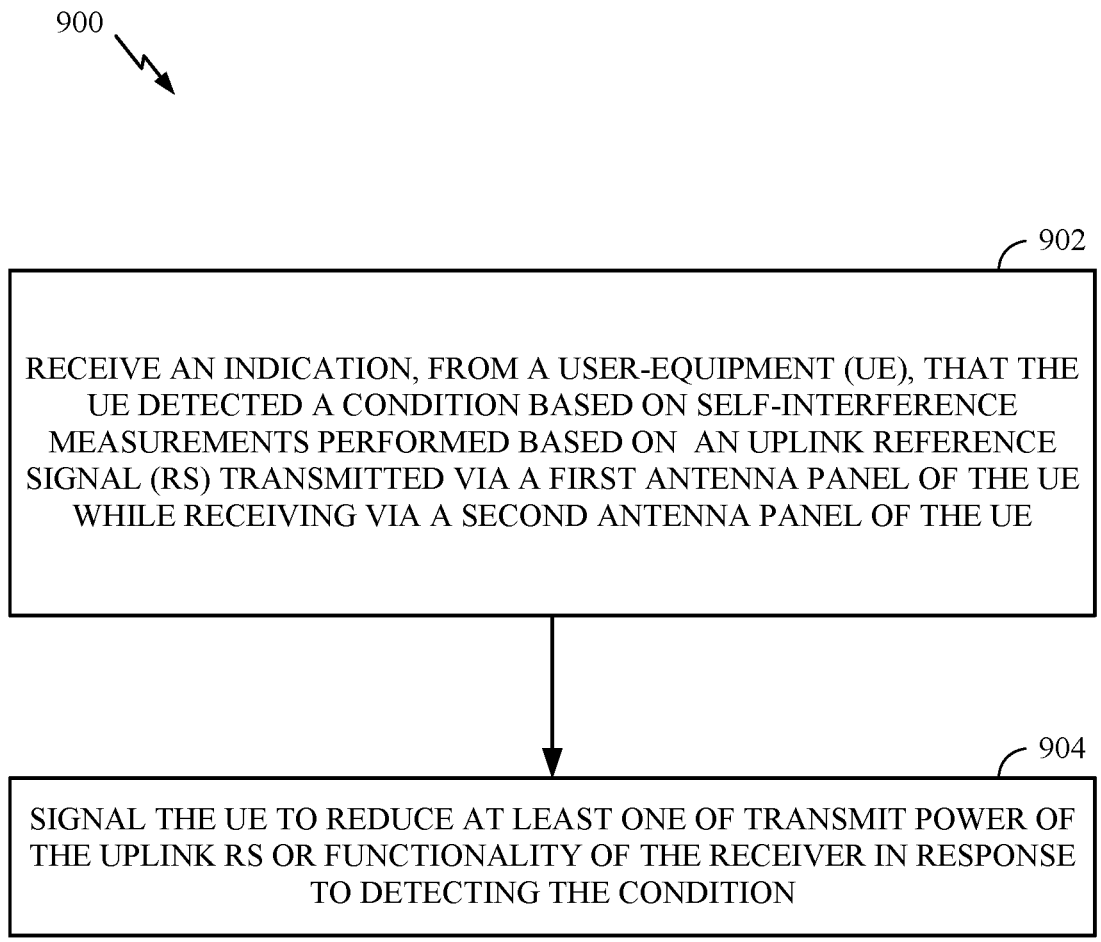
FIG. 9 illustrates example operations for wireless communications by a network entity, in accordance with certain aspects of the present disclosure.

FIG. 8 illustrates example operations 800 for wireless communications by a UE, in accordance with certain aspects of the present disclosure. For example, operations 800 may be performed by a UE 120 of FIG. 1 to detect and mitigate possible damage to a UE receiver while taking self-interference measurements.

Operations 800 begin, at 802, by transmitting uplink reference signals (RS) via a first antenna panel. For example, in some cases, the uplink RS may be transmitted in multiple symbols, with transmission power increased per symbol while sensing to detect a condition associated with potential damage to the receiver.

At 804, the UE performs self-interference measurements based on the uplink RS as received via a second antenna panel. At 806, the UE reduces, based on the self-interference measurements, at least one of transmit power of the uplink RS or functionality of the receiver. As will be described in greater details below, in some cases reducing transmit power may include partially reducing transmit power or turning off transmit power of the uplink RS. Similarly, reducing receiver functionality may include partially reducing receiver functionality (e.g., reducing amplifier gain) or turning off functionality of the receiver.

FIG. 9 illustrates example operations 900 for wireless communications by a network entity and may be considered complementary to operations 900 of FIG. 9. For example, operations 900 may be performed by a gNB to receive a signal from a UE (performing operations 800 of FIG. 8) indicating the UE detected a condition associated with possible damage to a UE receiver during self-interference measurements.

Figure 10A:
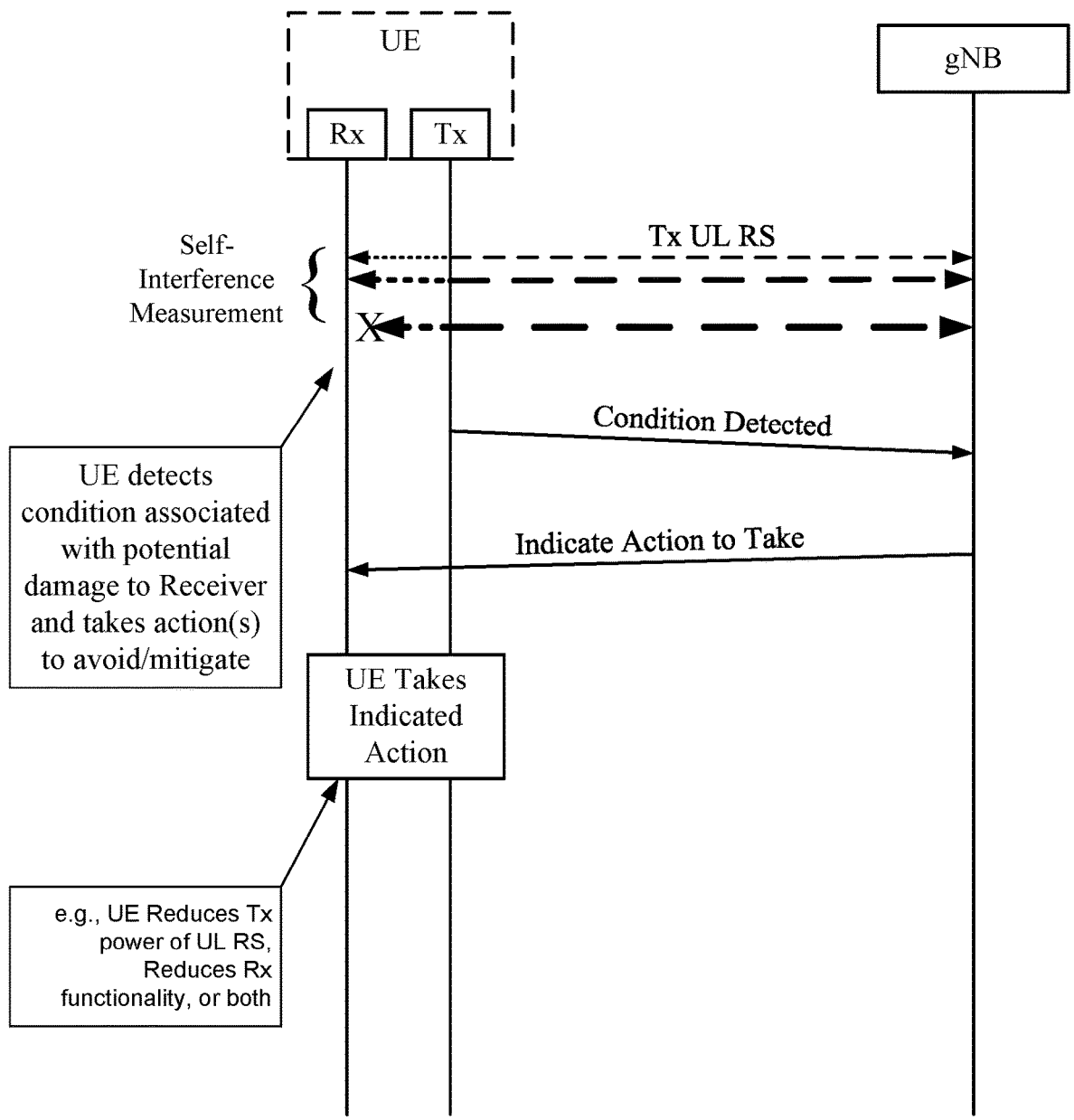
FIGS. 10A and 10B are call flow diagrams illustrating various aspects of the present disclosure.

Operations 900 begin, at 902, by receiving an indication, from a user-equipment (UE), that the UE detected a condition based on self-interference measurements performed based on an uplink reference signal (RS) transmitted via a first antenna panel of the UE while receiving via a second antenna panel of the UE. At 904, the network entity signals the UE to reduce at least one of transmit power of the uplink RS or functionality of the receiver, in response to detecting the condition. As will be described in greater detail below, in some cases, the network entity (e.g., gNB) may signal the UE a configuration for what action to take when detecting potential damage (e.g., whether to reduce transmit power, reduce receiver functionality, or both). In such cases, as illustrated in FIG. 10A, the UE may take action (immediately) upon detecting a condition indicating potential damage. In other cases, the network entity may signal the UE an indication of what action to take only after the UE sends a signal indicating it has detected potential damage, as illustrated in FIG. 10B.

Figure 10B:
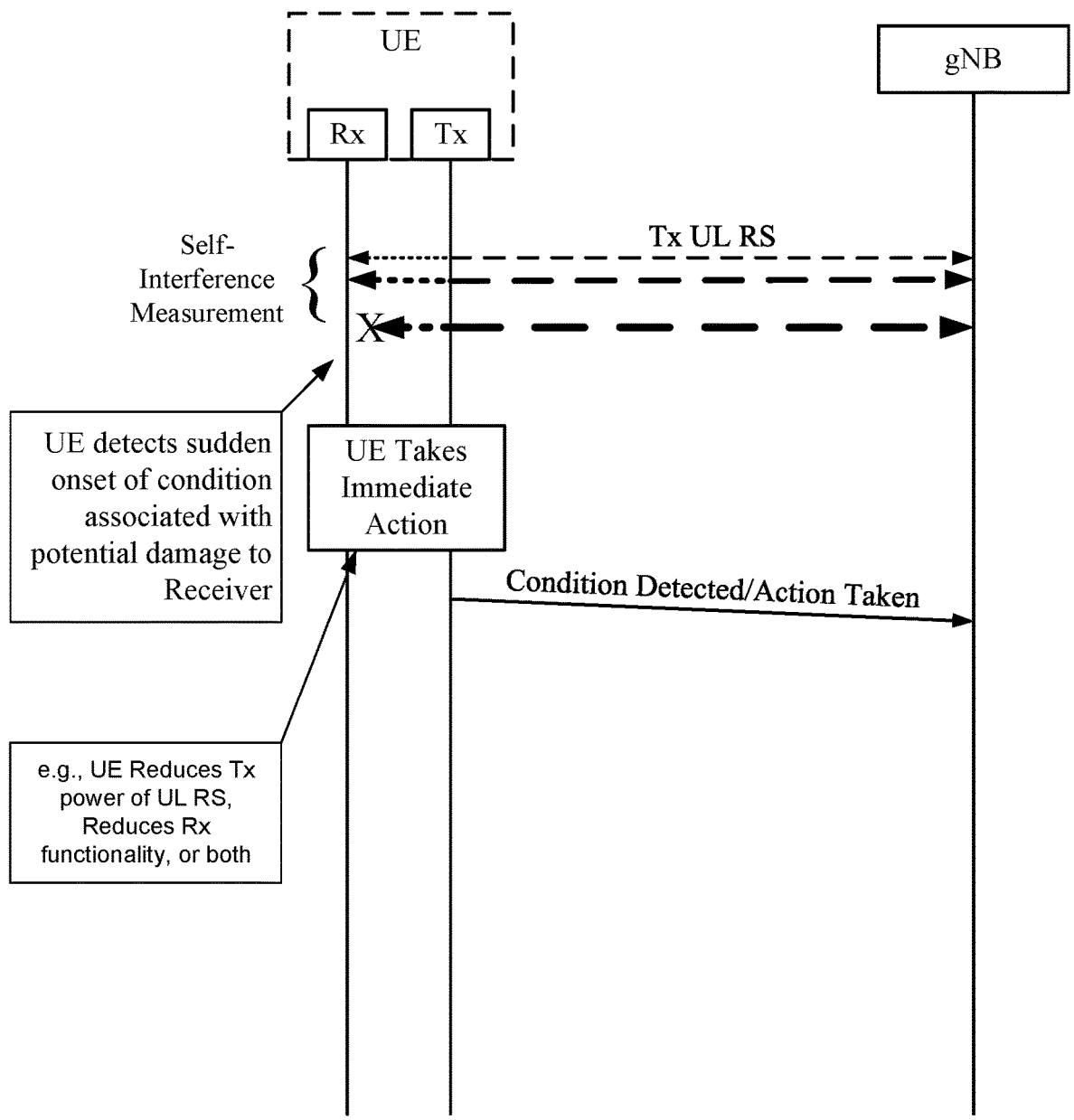

Operations 800 and 900 may be understood with reference to the call flow diagrams of FIGS. 10A and 10B.

Referring first to FIG. 10A, a UE is shown performing self-interference measurements (SIMS) by transmitting UL RS via one antenna panel (labeled Tx) and measuring the UL RS at another antenna panel (labeled Rx for receive).

As noted above, the uplink RS may be used to measure the SIM at the UE and further to select the top DL Rx and UL Tx beam pairs as the candidate beam pairs for full duplex (simultaneous UL/DL transmission) in FR2 transmissions. The uplink RS may include at least one of sounding reference signals (SRS), demodulation reference signals (DMRS) for a physical uplink control channel (PUCCH) or physical uplink shared channel (PUSCH), or a PUSCH or a PUCCH.

In some cases, the UE can sense a mode (or condition) indicating possible damage the UE receiver may be possible and take steps to avoid this happening. As noted above, the UE may transmit RS in multiple symbols, increasing transmit power gradually per symbol until full Tx power if there is no indication of a possibility damage to the receiver.

As illustrated in FIG. 10A, if the UE does detect a possibility of damage to the receiver, the UE may report the issue to the gNB. The UE may report the issue immediately (e.g., as soon as practical) in order to avoid damage. As illustrated, upon receiving the report, the gNB could indicate one or more actions for the UE to take in response. As indicated, example actions include reducing the Tx power of the RS, turning off the Tx power of the RS altogether (reducing Tx power to zero), or using a lower/reduced or turning off functionality of the receiver (e.g., reducing automatic gain control settings or turning off the receiver altogether).

As illustrated in FIG. 10B, if the condition indicating possible damage to the UE receiver occurs suddenly, the UE may need to take action before reporting to the network entity. For example, the UE may have to act (autonomously) in the middle of a slot or OFDM symbol, given the potentially serious consequences. As with the case noted above, the actions may include reducing the Tx power of the RS, turning off the Tx power of the RS altogether, and/or using a reduced or turning off functionality of the receiver. In some cases, the UE may provide the gNB with an indication of the action that it took (e.g., when reporting detection of the condition or separately).

If the action to mitigate or avoid damage to the UE receiver includes reducing transmit power, a framework similar to that used for maximum permissible exposure (MPE). Rather than protecting human tissue, however, such a framework may be designed to protect the device itself.

For example, while conventional MPE framework uses a power control equation to determine a maximum power the UE is allowed to transmit (Pcmax), based on a maximum power reduction (MPR) parameter, a similar equation and parameters (e.g., a parameter X-MPR for UL-RS transmit power control) could be used for the self-interference measurement procedure. In other words, such a framework could have separate parameters for human tissue versus for the device. As an alternative, the conventional MPE framework may be modified to also add consideration for a SIM related MPR parameter to ensure the device is not damaged. In some cases, this mechanism may be used for device protection only on the full-duplex OFDM symbols/slots.

In some cases, if the mitigation action is to reduce receiver functionality or turn off receiver, this may be effectively similar to beam blockage (e.g., due to some other cause). In this case, however, the Rx settings may be adjusted intentionally to block the beam to protect the device.

On the transmitter side, the UE may not need to turn off the transmitter fully. Rather, the UE may just reduce its Tx power, for example using the parameter X-MPR described above or reusing an existing parameter (e.g., P-MPRc).

Similarly, on the receiver side, the UE may not need to turn off the receiver fully. Rather, the UE may just adjust Rx settings so that the reception will not work as well as in the normal case, for example, because the receiver will be using a different AGC gain settings in lower functionality mode so as not to suffer damage from the transmission side.

In some cases, the UE may decide whether to apply mitigation on the transmitter side, the receiver side, or both. In some cases, the decision may be based on the rules that are predefined in the standard specification. In some cases, the decision may be based on signaling dynamically indicated by gNB, for example, with full duplex configurations, via RRC/MAC-CE/DCI. In either case, the decision may also consider (depend on) priorities of UL vs. DL traffic (e.g., UL URLLC traffic may have higher priority) or priority of channels (e.g., control channel or data channel), and the like.

As noted above with reference to FIG. 10B, in some cases, the UE may indicate back to gNB what type of mitigation action was performed. In some cases, this indication may be provided via a modified or "rich" Ack/Nack feedback.' For example, in addition to signaling a conventional negative acknowledgment (Nack), the UE may also indicate that the Nack was caused due to reduced receiver functionality (e.g., Rx turn-off) rather than poor channel condition.

In some cases, if the UL RS is SRS and the mitigation action is to send this SRS with reduced Tx SRS power, this may be achieved using an existing SRS configuration (e.g., via the PO setting). In some cases, this may allow for transparent operation, for example, using a separate SRS resource-set or having a new 'SIM-measurement' set-Usage (e.g., in addition to current codebook and non-codebook SRS set-Usages). In some cases, such SRS may have their own separate closed-loop (or closed-loop disabled).

In some cases, for the Rx RS configuration, there could be a mode where the Rx configuration is totally or partially derived implicitly from the Tx power in the Tx configuration. In such cases, the UE may be able to scale up the calculated RS measurements (e.g., RSRP or SINR) correspondingly.

Figure 11:
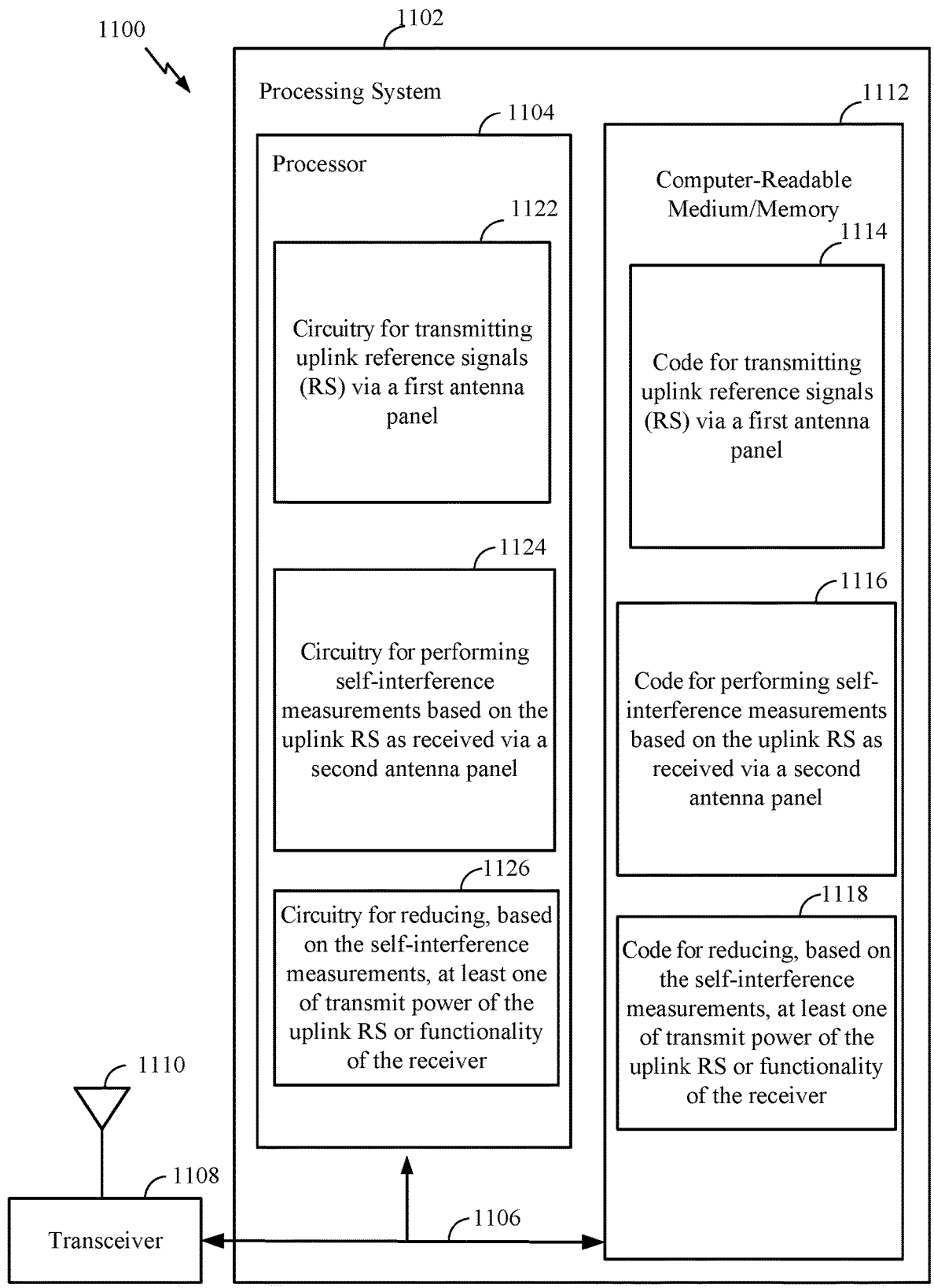
FIGS. 11 and 12 illustrate devices capable of performing the operations described herein, in accordance with certain aspects of the present disclosure.

FIG. 11 illustrates a communications device 1100 (e.g., a UE) that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein. In certain aspects, computer-readable medium/memory 1112 stores code 1114 for transmitting uplink reference signals (RS) via a first antenna panel; code 1116 for performing self-interference measurements based on the uplink RS as received via a second antenna panel; and code 1118 for reducing, based on the self-interference measurements, at least one of transmit power of the uplink RS or functionality of the receiver. In certain aspects, the processor 1104 has circuitry configured to implement the code stored in the computer-readable medium/memory 1112. The processor 1104 includes circuitry 1118 for transmitting uplink reference signals (RS) via a first antenna panel; circuitry 1120 for performing self-interference measurements based on the uplink RS as received via a second antenna panel; and circuitry 1022 for reducing, based on the self-interference measurements, at least one of transmit power of the uplink RS or functionality of the receiver.

Figure 12:
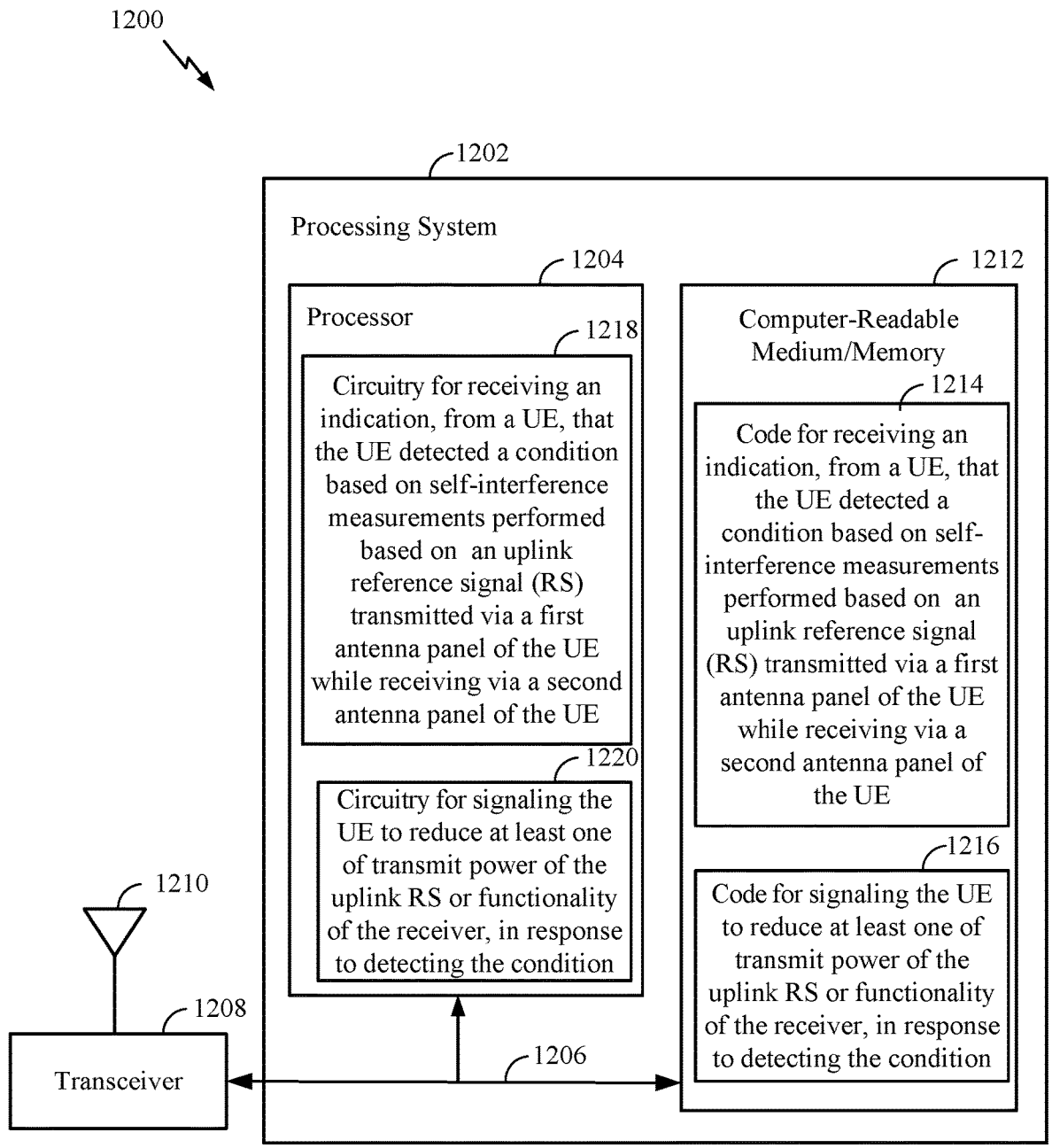

FIG. 12 illustrates a communications device 1200 (e.g., a network entity such as a gNB) that may include various components (e.g., corresponding to means-plus-function components) configured to perform operations for the techniques disclosed herein, such as the operations illustrated in FIG. 9. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein. In certain aspects, computer-readable medium/memory 1212 stores code 1214 for receiving an indication, from a user-equipment (UE), that the UE detected a condition based on self-interference measurements performed based on an uplink reference signal (RS) transmitted via a first antenna panel of the UE while receiving via a second antenna panel of the UE; and code 1216 for signaling the UE to reduce at least one of transmit power of the uplink RS or functionality of the receiver, in response to detecting the condition. In certain aspects, the processor 1204 has circuitry configured to implement the code stored in the computer-readable medium/memory 1212. The processor 1204 includes circuitry 1222 for receiving an indication, from a user-equipment (UE), that the UE detected a condition based on self-interference measurements performed based on an uplink reference signal (RS) transmitted via a first antenna panel of the UE while receiving via a second antenna panel of the UE; and circuitry 1224 for signaling the UE to reduce at least one of transmit power of the uplink RS or functionality of the receiver, in response to detecting the condition.

Example Aspects

Implementation examples are described in the following numbered aspects:

Aspect 1. An apparatus for wireless communication performed by a user-equipment (UE), comprising: at least one processor and a memory configured to transmit uplink reference signals (RS) via a first antenna panel; perform self-interference measurements based on the uplink RS as received via a second antenna panel; and reduce, based on the self-interference measurements, at least one of transmit power of the uplink RS or functionality of the receiver.

Aspect 2. The apparatus of Aspect 1, wherein the uplink RS comprise at least one of sounding reference signals (SRS), demodulation reference signals (DMRS) for a physical uplink control channel (PUCCH), DMRS for a physical uplink shared channel (PUSCH), a PUSCH, or a PUCCH.

Aspect 3. The apparatus of Aspect 1 or 2, wherein the uplink RS is transmitted in multiple symbols; and transmission power of the uplink RS is increased per symbol while performing the self-interference measurements.

Aspect 4. The apparatus of any of Aspects 1-3, wherein the at least one processor and memory configured to reduce both transmit power and functionality of the receiver.

Aspect 5. The apparatus of any of Aspects 1-4, wherein the at least one processor and memory are further configured to provide a network entity with an indication that a condition was detected, based on the self-interference measurements.

Aspect 6. The apparatus of Aspect 5, wherein the at least one processor and memory are further configured to receive signaling from the network entity indicating the UE is to reduce at least one of transmit power of the uplink RS or functionality of the receiver based on the condition.

Aspect 7. The apparatus of any of Aspect 5 or 6, wherein the indication also indicates the UE reduced at least one of transmit power of the uplink RS or functionality of the receiver based on the condition.

Aspect 8. The apparatus of any of any of Aspects 1-7, wherein the at least one of transmit power of the uplink RS or functionality of the receiver is reduced in a middle or end of a slot or orthogonal frequency division modulation (OFDM) symbol.

Aspect 9. The apparatus of any of Aspects 1-8, wherein the at least one processor and memory are configured to reduce transmit power of the uplink RS according to a power control equation.

Aspect 10. The apparatus of Aspect 9, wherein the power control equation is subject to at least one of a maximum power the UE is allowed to transmit during the self-interference measurement procedure; or a maximum power reduction (MPR) parameter for the self-interference measurement procedure.

Aspect 11. The apparatus of any of Aspects 1-10, wherein the at least one processor and memory are configured to reduce functionality of the receiver by adjusting an automatic gain control (AGC) setting.

Aspect 12. The apparatus of any of Aspects 1-11, wherein the at least one processor and memory are further configured to decide whether to reduce transmit power of the uplink RS, reduce functionality of the receive, or reduce both transmit power of the uplink RS and functionality of the receiver, are based on at least one of a predefined rule; or signaling from a network entity.

Aspect 13. The apparatus of Aspect 12, wherein the signaling comprises at least one of radio resource control (RRC), medium access control (MAC) control element (CE), or downlink control information (DCI) signaling.

Aspect 14. The apparatus of Aspect 12, wherein the decision is also based on at least one of priorities of uplink traffic versus downlink traffic; or priorities of data channels versus control channels.

Aspect 15. The apparatus of any of Aspects 1-14, wherein the at least one processor and memory are further configured to provide a network entity with an indication that the UE reduced at least one of transmit power of the uplink RS or functionality of the receiver.

Aspect 16. The apparatus of Aspect 15, wherein the indication is provided via negative acknowledgment feedback that indicates the negative acknowledgment is due to reduced or turned off functionality of the receiver.

Aspect 17. The apparatus of any of Aspects 1-16, wherein the uplink RS comprises sounding reference signals (SRS); and the at least one processor and memory are configured to use at least one of a separately configured SRS resource set or an SRS resource set usage configured for self-interference measurement.

Aspect 18. The apparatus of any of Aspects 1-17, wherein the at least one processor and memory are further configured to derive a configuration for receiving the uplink RS based on a configuration for transmitting the uplink RS; and scale the uplink RS measurement based on the derived configuration.

Aspect 19. An apparatus for wireless communication performed by a network entity, comprising at least one processor and a memory configured to receive an indication, from a UE, that the UE detected a condition based on self-interference measurements performed based on an uplink RS transmitted via a first antenna panel of the UE while receiving via a second antenna panel of the UE; and signal the UE to reduce at least one of transmit power of the uplink RS or functionality of the receiver, in response to detecting the condition.

Aspect 20. The apparatus of Aspect 19, wherein the uplink RS comprise at least one of SRS, DMRS for a physical uplink control channel (PUCCH), DMRS for a physical uplink shared channel (PUSCH), a PUSCH, or a PUCCH.

Aspect 21. The apparatus of Aspect 19 or 20, further comprising receiving signaling from the UE indicating the UE reduced at least one of transmit power of the uplink RS or functionality of the receiver in response to detecting the condition.

Aspect 22. The apparatus of Aspect 21, wherein the indication is provided via negative acknowledgment feedback that indicates the negative acknowledgment is due to reduced functionality of the receiver.

Aspect 23. The apparatus of Aspect 21 or 22, wherein the UE reduces at least one of transmit power of the uplink RS or functionality of the receiver before providing the indication to the network entity that the condition was detected.

Aspect 24: A method for wireless communication, comprising performing one or more of the operations described and in accordance with any one of Aspects 1-23.

Aspect 25: An apparatus, comprising means for performing a method in accordance with any one of Aspects 1-23.

Aspect 26: A non-transitory computer-readable medium comprising executable instructions that, when executed by one or more processors of an apparatus, cause the apparatus to perform a method in accordance with any one of Aspects 1-23.

Aspect 27: A computer program product embodied on a computer-readable storage medium comprising code for performing a method in accordance with any one of Aspects 1-23.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors controller/processor 280 of the UE 120 120 may be configured to perform operations 800 of FIG. 8, while controller/processor 240 of the B S 110 shown in FIG. 2 may be configured to perform operations 900 of FIG. 9.

Means for receiving may include a receiver (such as one or more antennas or receive processors) illustrated in FIG. 2. Means for transmitting may include a transmitter (such as one or more antennas or transmit processors) illustrated in FIG. 2. Means for determining, means for processing, means for treating, and means for applying may include a processing system, which may include one or more processors of the UE 120 and/or one or more processors of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication performed by a user-equipment (UE), comprising:
   at least one processor and a memory configured to cause the apparatus to:
      transmit uplink reference signals (RS) via a first antenna panel;
      perform self-interference measurements based on the uplink RS as received via a second antenna panel; and
      reduce both transmit power of the uplink RS and functionality of a receiver based on the self-interference measurements and at least one of: priorities of uplink traffic versus downlink traffic, or priorities of data channels versus control channels.

2. The apparatus of claim 1, wherein the uplink RS comprise at least one of sounding reference signals (SRS), demodulation reference signals (DMRS) for a physical uplink control channel (PUCCH), DMRS for a physical uplink shared channel (PUSCH), a PUSCH, or a PUCCH.

3. The apparatus of claim 1, wherein the at least one processor and the memory are further configure to cause the apparatus to:
   transmit the uplink RS in multiple symbols; and
   increase the transmit power of the uplink RS per symbol during performance of the self-interference measurements.

4. The apparatus of claim 1, wherein the at least one processor and memory are further configured to cause the apparatus to provide a network entity with an indication that a condition was detected, based on the self-interference measurements.

5. The apparatus of claim 4, wherein the at least one processor and memory are further configured to cause the apparatus to:
   receive signaling from the network entity indicating the UE is to reduce at least one of transmit power of the uplink RS or functionality of the receiver based on the condition.

6. The apparatus of any of claim 4, wherein the indication also indicates the UE reduced at least one of transmit power of the uplink RS or functionality of the receiver based on the condition.

7. The apparatus of any of claim 1, wherein the at least one processor and memory are further configured to cause the apparatus to reduce the transmit power of the uplink RS or functionality of the receiver in a middle or end of a slot or orthogonal frequency division modulation (OFDM) symbol.

8. The apparatus of claim 1, wherein the at least one processor and memory are configured to cause the apparatus to reduce transmit power of the uplink RS according to a power control equation.

9. The apparatus of claim 8, wherein the power control equation is subject to at least one of:
   a maximum power the UE is allowed to transmit during the self-interference measurements; or
   a maximum power reduction (MPR) parameter for the self-interference measurements.

10. The apparatus of claim 1, wherein the at least one processor and memory are configured to cause the apparatus to reduce functionality of the receiver by adjusting an automatic gain control (AGC) setting.

11. The apparatus of claim 1, wherein the at least one processor and memory are further configured to cause the apparatus to decide whether to reduce transmit power of the uplink RS, reduce functionality of the receiver, or reduce both transmit power of the uplink RS and functionality of the receiver, based on at least one of:
   a predefined rule; or
   signaling from a network entity.

12. The apparatus of claim 11, wherein the signaling comprises at least one of radio resource control (RRC), medium access control (MAC) control element (CE), or downlink control information (DCI) signaling.

13. The apparatus of claim 1, wherein the at least one processor and memory are further configured to cause the apparatus to provide a network entity with an indication that the UE reduced at least one of transmit power of the uplink RS or functionality of the receiver.

14. The apparatus of claim 13, wherein at least one processor and memory are configured to cause the apparatus to provide the indication via negative acknowledgment feedback that indicates the negative acknowledgment is due to reduced or turned off functionality of the receiver.

15. The apparatus of claim 1, wherein:
   the uplink RS comprises sounding reference signals (SRS); and
   the at least one processor and memory are configured to cause the apparatus to use at least one of a separately configured SRS resource set or an SRS resource set usage configured for self-interference measurement.

16. The apparatus of claim 1, wherein the at least one processor and memory are further configured to cause the apparatus to:
   derive a configuration for receiving the uplink RS based on a configuration for transmitting the uplink RS; and
   scale the uplink RS measurement based on the derived configuration.

17. A method for wireless communication performed by a user-equipment (UE), comprising:
   transmitting uplink reference signals (RS) via a first antenna panel;
   performing self-interference measurements based on the uplink RS as received via a second antenna panel; and
   reducing both transmit power of the uplink RS and functionality of a receiver based on the self-interference measurements and at least one of: priorities of uplink traffic versus downlink traffic, or priorities of data channels versus control channels.

18. The method of claim 17, wherein the uplink RS comprise at least one of sounding reference signals (SRS), demodulation reference signals (DMRS) for a physical uplink control channel (PUCCH) or physical uplink shared channel (PUSCH), or a PUSCH or a PUCCH.

19. The method of claim 17, further comprising providing a network entity with an indication that a condition was detected, based on the self-interference measurements.

20. The method of claim 19, further comprising:
receiving signaling from the network entity indicating the UE is to reduce at least one of transmit power of the uplink RS or functionality of the receiver based on the condition.

21. The method of claim 17, wherein the transmit power of the uplink RS is reduced according to a power control equation.

22. An apparatus for wireless communication performed by a user-equipment (UE), comprising:
means for transmitting uplink reference signals (RS) via a first antenna panel;
means for performing self-interference measurements based on the uplink RS as received via a second antenna panel; and
means for reducing both transmit power of the uplink RS and functionality of a receiver based on the self-interference measurements and at least one of: priorities of uplink traffic versus downlink traffic, or priorities of data channels versus control channels.

23. A non-transitory computer readable medium having instructions stored thereon which when executed by one or more processors in a user equipment (UE), causes an apparatus to perform a method, the method comprising:
transmitting uplink reference signals (RS) via a first antenna panel;
performing self-interference measurements based on the uplink RS as received via a second antenna panel; and
reducing both transmit power of the uplink RS and functionality of a receiver based on the self-interference measurements and at least one of: priorities of uplink traffic versus downlink traffic, or priorities of data channels versus control channels.

24. The non-transitory computer readable medium of claim 23, wherein the uplink RS comprise at least one of sounding reference signals (SRS), demodulation reference signals (DMRS) for a physical uplink control channel (PUCCH), DMRS for a physical uplink shared channel (PUSCH), a PUSCH, or a PUCCH.

25. The non-transitory computer readable medium of claim 23, wherein:
the uplink RS is transmitted in multiple symbols; and
transmission power of the uplink RS is increased per symbol while performing the self-interference measurements.

26. The non-transitory computer readable medium of claim 23, wherein the at least one of transmit power of the uplink RS or functionality of the receiver is reduced in a middle or end of a slot or orthogonal frequency division modulation (OFDM) symbol.

27. The non-transitory computer readable medium of claim 23, wherein reducing at least one of transmit power of the uplink RS or functionality of a receiver is also based on at least one of:
a predefined rule; or
signaling from a network entity.

* * * * *